US012591288B2

(12) United States Patent
Chang

(10) Patent No.: US 12,591,288 B2
(45) Date of Patent: Mar. 31, 2026

(54) CONTROL METHOD FOR DETECTING SYSTEM, DETECTING SYSTEM AND VEHICLE

(71) Applicant: TRIPLE WIN TECHNOLOGY(SHENZHEN) CO. LTD., Shenzhen (CN)

(72) Inventor: Chih-Liang Chang, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 131 days.

(21) Appl. No.: 18/782,139

(22) Filed: Jul. 24, 2024

(65) Prior Publication Data

US 2025/0291400 A1     Sep. 18, 2025

(30) Foreign Application Priority Data

Mar. 14, 2024     (CN) .......................... 202410294030.1

(51) Int. Cl.
| | |
|---|---|
| *G06F 1/3206* | (2019.01) |
| *G01S 13/92* | (2006.01) |
| *G01S 13/931* | (2020.01) |
| *G01S 15/58* | (2006.01) |
| *G01S 15/931* | (2020.01) |

(52) U.S. Cl.
CPC ............ *G06F 1/3206* (2013.01); *G01S 13/92* (2013.01); *G01S 13/931* (2013.01); *G01S 15/58* (2013.01); *G01S 15/931* (2013.01)

(58) Field of Classification Search
CPC ........ G06F 1/3206; G01S 13/92; G01S 15/58; G01S 15/931

USPC .......................................................... 713/320
See application file for complete search history.

(56) References Cited

U.S. PATENT DOCUMENTS

| | | | | |
|---|---|---|---|---|
| 5,887,268 A | * | 3/1999 | Furukawa | .............. G05D 1/028 |
| | | | | 701/25 |
| 6,282,483 B1 | * | 8/2001 | Yano | .................. B60K 31/0008 |
| | | | | 701/96 |
| 6,404,381 B1 | * | 6/2002 | Heide | ................... G01S 13/584 |
| | | | | 342/128 |
| 6,469,653 B1 | * | 10/2002 | Haynes | .................. G08G 1/054 |
| | | | | 340/936 |
| 6,701,234 B1 | * | 3/2004 | Vogelsang | .............. G01P 1/127 |
| | | | | 701/32.4 |

(Continued)

*Primary Examiner* — Paul R. Myers
(74) *Attorney, Agent, or Firm* — ScienBiziP, P.C.

(57) ABSTRACT

A detecting system, a control method therefor and a vehicle are provided, including a transmitting circuit, a receiving circuit, a driving circuit, a positioning circuit, and an inertia detecting circuit; the transmitting circuit and the receiving circuit detect a distance to an object within a target range. The control method includes obtaining positioning information and acceleration information of a current cycle; obtaining a speed and an acceleration of the current cycle according to the positioning information, the acceleration information, and a preset correction algorithm; obtaining a predicted speed and a predicted acceleration of a next cycle according to the speed, the acceleration, and a preset prediction algorithm; and in the next cycle, controlling the driving circuit according to the predicted speed and the predicted acceleration to control the power consumption of the transmitting circuit and the receiving circuit.

20 Claims, 6 Drawing Sheets

(56)                    References Cited

U.S. PATENT DOCUMENTS

| | | | | |
|---|---|---|---|---|
| 9,418,557 | B2* | 8/2016 | Kawamata | G07C 5/02 |
| 10,059,330 | B2* | 8/2018 | Gaither | B60W 30/182 |
| 10,717,427 | B2* | 7/2020 | Park | B60K 6/48 |
| 12,512,006 | B2* | 12/2025 | May | G08G 5/80 |
| 2005/0041529 | A1* | 2/2005 | Schliep | G01S 15/931 |
| | | | | 367/99 |
| 2006/0156076 | A1* | 7/2006 | Mayer | G01S 13/931 |
| | | | | 714/55 |
| 2008/0169965 | A1* | 7/2008 | Minichshofer | G01S 15/931 |
| | | | | 342/72 |
| 2010/0085236 | A1* | 4/2010 | Franceschini | G01S 13/782 |
| | | | | 342/30 |
| 2010/0277359 | A1* | 11/2010 | Ando | G01S 13/34 |
| | | | | 342/70 |
| 2011/0234449 | A1* | 9/2011 | Haberland | G01S 13/931 |
| | | | | 342/70 |
| 2014/0306641 | A1* | 10/2014 | Igarashi | H02P 23/12 |
| | | | | 318/561 |
| 2015/0168539 | A1* | 6/2015 | Himmelstoss | G01S 13/931 |
| | | | | 342/159 |
| 2015/0309165 | A1* | 10/2015 | Elwart | G01S 13/931 |
| | | | | 342/61 |
| 2017/0001264 | A1* | 1/2017 | Szini | B23K 26/361 |
| 2017/0110021 | A1* | 4/2017 | Skagius | B60K 35/28 |
| 2017/0242095 | A1* | 8/2017 | Schuh | G08G 1/163 |
| 2018/0096294 | A1* | 4/2018 | Winkle | B65D 81/18 |
| 2018/0215373 | A1* | 8/2018 | Varnhagen | B60W 30/02 |
| 2020/0386881 | A1* | 12/2020 | Buddendick | G01S 13/589 |
| 2023/0017850 | A1* | 1/2023 | Thorson | G05D 1/0255 |

* cited by examiner

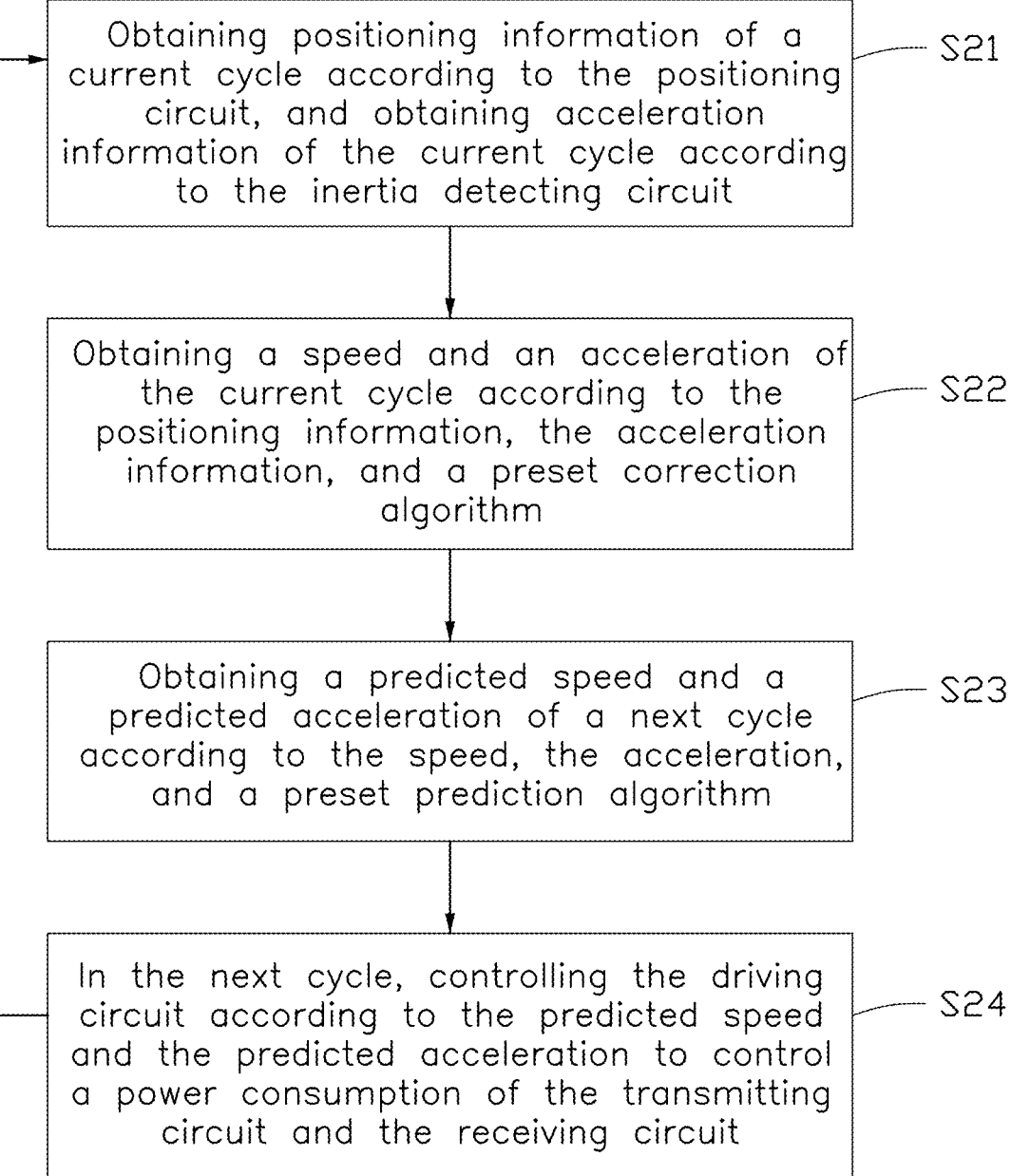

Obtaining positioning information of a current cycle according to the positioning circuit, and obtaining acceleration information of the current cycle according to the inertia detecting circuit ⎯ S21

Obtaining a speed and an acceleration of the current cycle according to the positioning information, the acceleration information, and a preset correction algorithm ⎯ S22

Obtaining a predicted speed and a predicted acceleration of a next cycle according to the speed, the acceleration, and a preset prediction algorithm ⎯ S23

In the next cycle, controlling the driving circuit according to the predicted speed and the predicted acceleration to control a power consumption of the transmitting circuit and the receiving circuit ⎯ S24

FIG. 2

Obtaining an initial speed according to the positioning information — S31

Calibrating the initial speed according to the acceleration information to obtain the speed — S32

Performing algorithm simulation according to the acceleration information and historical accelerations to obtain the acceleration — S33

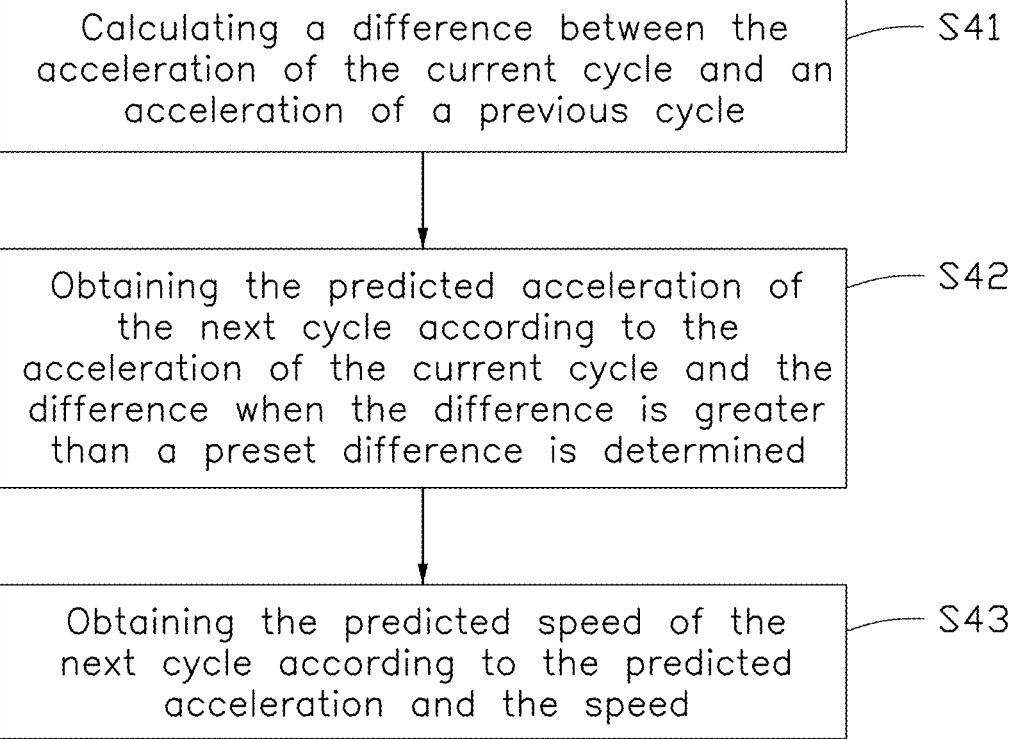

Calculating a difference between the acceleration of the current cycle and an acceleration of a previous cycle — S41

Obtaining the predicted acceleration of the next cycle according to the acceleration of the current cycle and the difference when the difference is greater than a preset difference is determined — S42

Obtaining the predicted speed of the next cycle according to the predicted acceleration and the speed — S43

FIG. 4

CONTROL METHOD FOR DETECTING SYSTEM, DETECTING SYSTEM AND VEHICLE

CROSS-REFERENCE TO RELATED APPLICATIONS

This application claims priority to Chinese Patent Application No. 202410294030.1 filed on Mar. 14, 2024, in China National Intellectual Property Administration, the contents of which are incorporated by reference herein.

FIELD

The subject matter herein generally relates to detecting technologies, and specially relates to a control method for detecting system, a detecting system, and a vehicle.

BACKGROUND

At present, vehicles and other mobile platforms generally use batteries to store electrical energy for various system operations. A detecting system based on mobile safety also needs to use the electrical energy. However, during the operation of vehicles and other mobile platforms, the power consumption of the detecting system cannot be ignored. To a large extent, the power consumption of the detecting system will affect the overall power consumption of vehicles and other mobile platforms, thus making the power consumption of vehicles and other mobile platforms higher.

BRIEF DESCRIPTION OF THE DRAWINGS

Implementations of the present disclosure will now be described, by way of example only, with reference to the attached figures.

FIG. 2 is a flow chart of an embodiment of the present application of a control method for detecting system.

FIG. 4 is a flow chart of an embodiment of the present application of a method for obtaining predicted speed and predicted acceleration.

DETAILED DESCRIPTION

Figure 1:
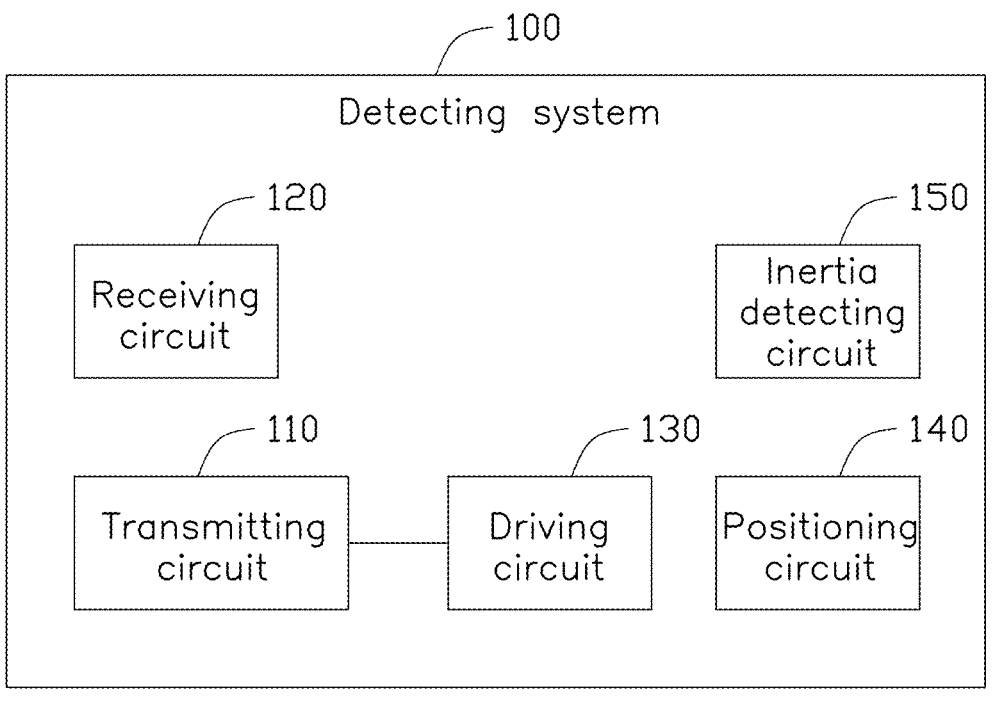
FIG. 1 is a schematic diagram of an embodiment of the present application of a detecting system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better show details and features of the present disclosure.

Several definitions that apply throughout this disclosure will now be presented.

The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but may have one or more deviations from a true cylinder. The term "comprising," when utilized, means "including, but not necessarily limited to"; it specifically indicates open-ended inclusion or membership in the so-described combination, group, series, and the like.

At present, vehicles and other mobile platforms generally use batteries to store electrical energy for various system operations. A detecting system based on mobile safety also needs to use the electrical energy. However, during the operation of vehicles and other mobile platforms, the power consumption of the detecting system cannot be ignored. To a large extent, the power consumption of the detecting system will affect the overall power consumption of vehicles and other mobile platforms, thus making the power consumption of vehicles and other mobile platforms higher.

A control method for detecting system, a detecting system, and a vehicle are provided, which are configured to reduce the power consumption of the detecting system, to further reduce the power consumption of vehicles and other mobile platforms. In at least one embodiment, the vehicle can be a car, an automobile, a truck, etc.

FIG. 1 illustrates a schematic diagram of an embodiment of the present application of a detecting system. The detecting system 100 includes a transmitting circuit 110, a receiving circuit 120, a driving circuit 130, a positioning circuit 140, and an inertia detecting circuit 150.

The transmitting circuit 110 and the receiving circuit 120 are used to detect a distance to an object within a target range. The driving circuit 130 is used to supply power to the transmitting circuit 110 and the receiving circuit 120 and control a power consumption of the transmitting circuit 110 and the receiving circuit 120.

The control method for detecting system provided by an embodiment of the present application is introduced in conjunction with FIG. 1. FIG. 2 illustrates a flow chart of an embodiment of control method for detecting system. The method may include:

At block S21, obtaining positioning information of a current cycle according to the positioning circuit, and obtaining acceleration information of the current cycle according to the inertia detecting circuit 150.

In at least one embodiment, the detecting system further includes a controller, for example, in an electric vehicle, the controller may be an onboard computer controller, and in a drone, the controller may be a microprocessor, etc., which are not limited here. The controller is connected to the positioning circuit and the inertia detecting circuit, and obtains positioning information of the current cycle through the positioning circuit, and obtains the acceleration information of the current cycle through the inertia detecting circuit.

The positioning circuit includes a GPS (Global Positioning System) and the like, which is not limited here.

At block S22, obtaining a speed and an acceleration of the current cycle according to the positioning information, the acceleration information, and a preset correction algorithm.

In at least one embodiment, after obtaining the positioning information and the acceleration information of the current cycle, the controller can correct the positioning information and the acceleration information according to the preset correction algorithm, so as to obtain the speed and the acceleration of the current cycle after correction.

In at least one embodiment, the preset correction algorithm includes correcting the acceleration information by the positioning information, or correcting the positioning information by the acceleration information, etc., which is not limited here.

At block S23, obtaining a predicted speed and a predicted acceleration of a next cycle according to the speed, the acceleration, and a preset prediction algorithm.

In at least one embodiment, after obtaining the speed and the acceleration of the current cycle, the controller can obtain the predicted speed and the predicted acceleration of the next cycle according to the preset prediction algorithm.

In at least one embodiment, the preset prediction algorithm may be a linear regression algorithm, that is, the controller may fit a corresponding speed curve according to historical speeds and the speed of the current cycle through the linear regression algorithm, thereby obtaining the predicted speed of the next cycle according to the speed curve. Similarly, the controller can fit a corresponding acceleration curve according to historical accelerations and the acceleration of the current cycle through the linear regression algorithm, thereby obtaining the predicted acceleration of the next cycle according to the acceleration curve.

At block S24, in the next cycle, controlling the driving circuit according to the predicted speed and the predicted acceleration to control a power consumption of the transmitting circuit and the receiving circuit, and the process returns to block S21.

In at least one embodiment, after obtaining the predicted speed and the predicted acceleration, the controller controls the driving circuit according to the predicted speed and the predicted acceleration to control the power consumption of the transmitting circuit and the receiving circuit. For example, when the predicted speed and the predicted acceleration are both greater than the speed and the acceleration of the current cycle, it means that the electric vehicle is in an accelerating state. In order to improve driving safety, it is necessary to expand the detecting range, and it is necessary to control the driving circuit to increase the power consumption of the transmitting circuit and the receiving circuit. When the predicted speed and the acceleration are both smaller than the speed and the acceleration of the current cycle, it means that the electric vehicle is in a decelerating state. Therefore, the detecting range can be appropriately reduced while ensuring driving safety, and it is necessary to control the driving circuit to reduce the power consumption of the transmitting circuit and the receiving circuit. Similarly, if a difference between the predicted speed and the speed of the current cycle is within a preset range and the predicted acceleration is small, it means that the electric vehicle is in a constant speed state, and the driving circuit can be controlled to maintain the current power consumption of the transmitting circuit and the receiving circuit.

In the control method of the present application, the positioning information is obtained through the positioning circuit and the acceleration information is obtained through the inertial detecting circuit. The speed and the acceleration of the current cycle are obtained according to the positioning information and the acceleration information through the correction algorithm. The accuracy of the speed and the acceleration of the current cycle can be improved, thereby improving the accuracy of the predicted speed and the predicted acceleration of the next cycle. The power consumption of the transmitting circuit and the receiving circuit is controlled according to the predicted speed and the predicted acceleration, which can effectively reduce the power consumption of the detecting system, thereby reducing the power consumption of vehicles and other mobile platforms.

In at least one embodiment, the predicted speed and the predicted acceleration are proportional to the power consumption, that is, the greater the predicted speed and the predicted acceleration, the greater the power consumption of the transmitting circuit and the receiving circuit is controlled; the smaller the predicted speed and the predicted acceleration, the smaller the power consumption of the transmitting circuit and the receiving circuit is controlled. In some embodiments, the controller may also store a relationship table between the predicted speed, the predicted acceleration, and the power consumption. After obtaining the predicted speed and predicted acceleration, the controller may match the relationship table to quickly obtain the corresponding power consumption and then control the driving circuit.

Figure 3:
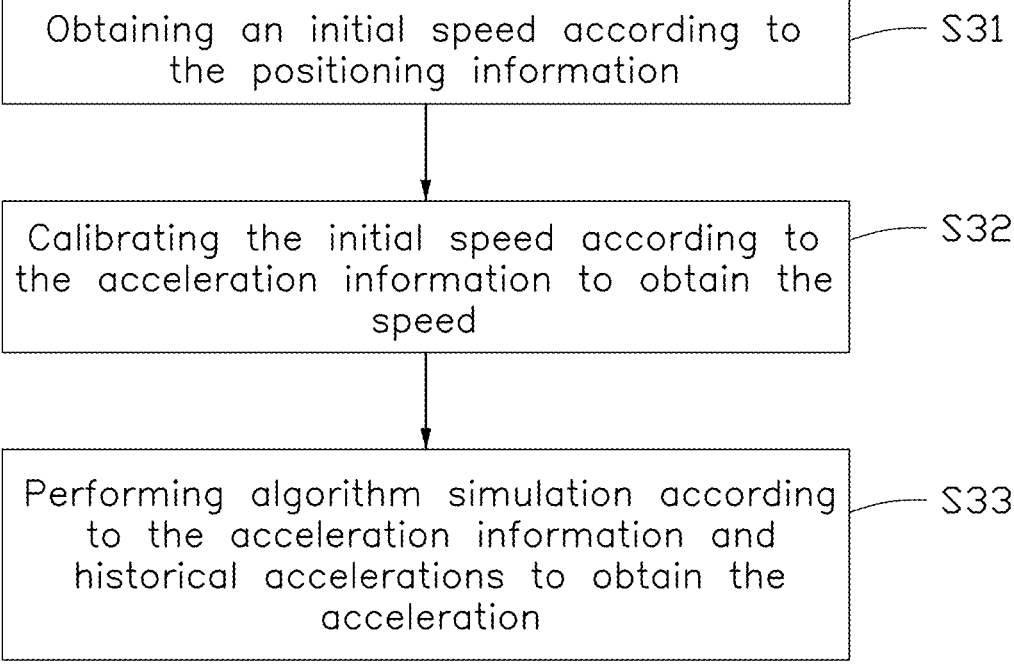
FIG. 3 is a flow chart of an embodiment of the present application of a method for obtaining speed and acceleration.

FIG. 3 is a flow chart of an embodiment of the present application of a method for obtaining speed and acceleration. The method may include:

At block S31, obtaining an initial speed according to the positioning information.

At block S32, calibrating the initial speed according to the acceleration information to obtain the speed.

In at least one embodiment, after obtaining the positioning information, the controller can obtain the initial speed according to the positioning information, for example, the controller obtains the initial speed through a distance between a current positioning point and a previous positioning point in the positioning information and a time interval between the two positioning points. After obtaining the initial speed, the controller can calibrate and correct the initial speed using the acceleration information to obtain a more accurate speed of the current cycle.

At block S33, performing algorithm simulation according to the acceleration information and historical accelerations to obtain the acceleration.

In at least one embodiment, the controller also records the acceleration information of each cycle to generate historical accelerations, and performs the algorithm simulation in the current cycle according to the corresponding acceleration information and historical accelerations to obtain an acceleration curve. For example, linear regression can be performed according to the acceleration information and the historical accelerations to obtain the acceleration curve, thereby obtaining a more accurate acceleration of the current cycle.

FIG. 4 is a flow chart of an embodiment of the present application of a method for obtaining predicted speed and predicted acceleration. The method may include:

At block S41, calculating a difference between the acceleration of the current cycle and an acceleration of a previous cycle.

At block S42, obtaining the predicted acceleration of the next cycle according to the acceleration of the current cycle and the difference when the difference is greater than a preset difference is determined.

At block S43, obtaining the predicted speed of the next cycle according to the predicted acceleration and the speed.

In at least one embodiment, when it is determined that the difference is greater than the preset difference, it can be determined that the vehicle is in an accelerating state or a decelerating state, and the controller can also obtain the predicted acceleration of the next cycle according to the difference and the acceleration of the current cycle. For example, if the acceleration of the current cycle is greater than the acceleration of the previous cycle, it means that the vehicle is in an accelerating state, and the acceleration of the current cycle is added to the difference to obtain the predicted acceleration of the next cycle. If the acceleration of the current cycle is less than the acceleration of the previous cycle, it means that the vehicle is in a decelerating state, and the acceleration of the current cycle is subtracted from the difference to obtain the predicted acceleration of the next cycle.

After obtaining the predicted acceleration, the controller can also obtain the predicted speed of the next cycle according to the speed of the current cycle and the predicted acceleration.

In some embodiments, controlling the power consumption of the transmitting circuit and the receiving circuit includes: controlling the power of the transmitting circuit, and/or controlling the number of signal transmissions of the transmitting circuit and the number of signal receptions of the receiving circuit. The power, the number of signal transmissions, and the number of signal receptions are proportional to the predicted speed and the predicted acceleration.

Figure 5:
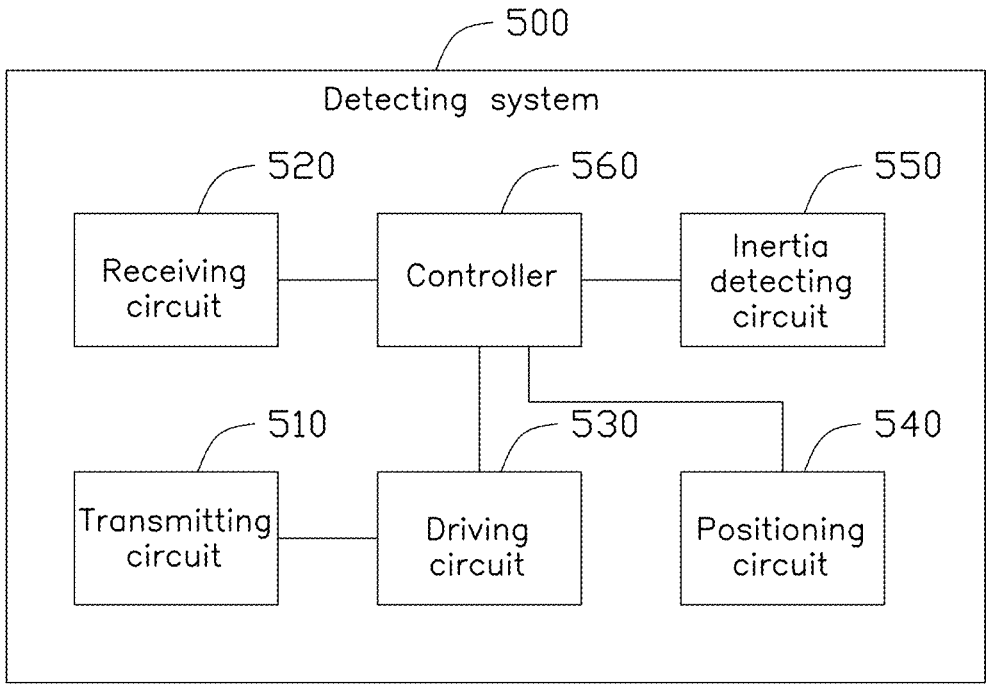
FIG. 5 is a schematic diagram of an embodiment of the present application of a detecting system.

FIG. 5 is a schematic diagram of an embodiment of the present application of a detecting system. The detecting system 500 includes a transmitting circuit 510, a receiving circuit 520, a driving circuit 530, a positioning circuit 540, an inertia detecting circuit 550, and a controller 560.

The transmitting circuit 510 and the receiving circuit 520 are used to detect a distance to an object within a target range. The driving circuit 530 is used to supply power to the transmitting circuit 510 and the receiving circuit 520 and control a power consumption of the transmitting circuit 510 and the receiving circuit 520. The controller 560 is connected to the receiving circuit 520, the driving circuit 530, the positioning circuit 540, and the inertia detection circuit 550.

The controller 560 is used to execute the control method for the detecting system 500 of any of the above embodiments. The beneficial effects that can be achieved by the detecting system 500 of the embodiment of the present application can refer to the beneficial effects of the control method for the detecting system 500 in the above embodiments, which will not be repeated here.

Figure 6:
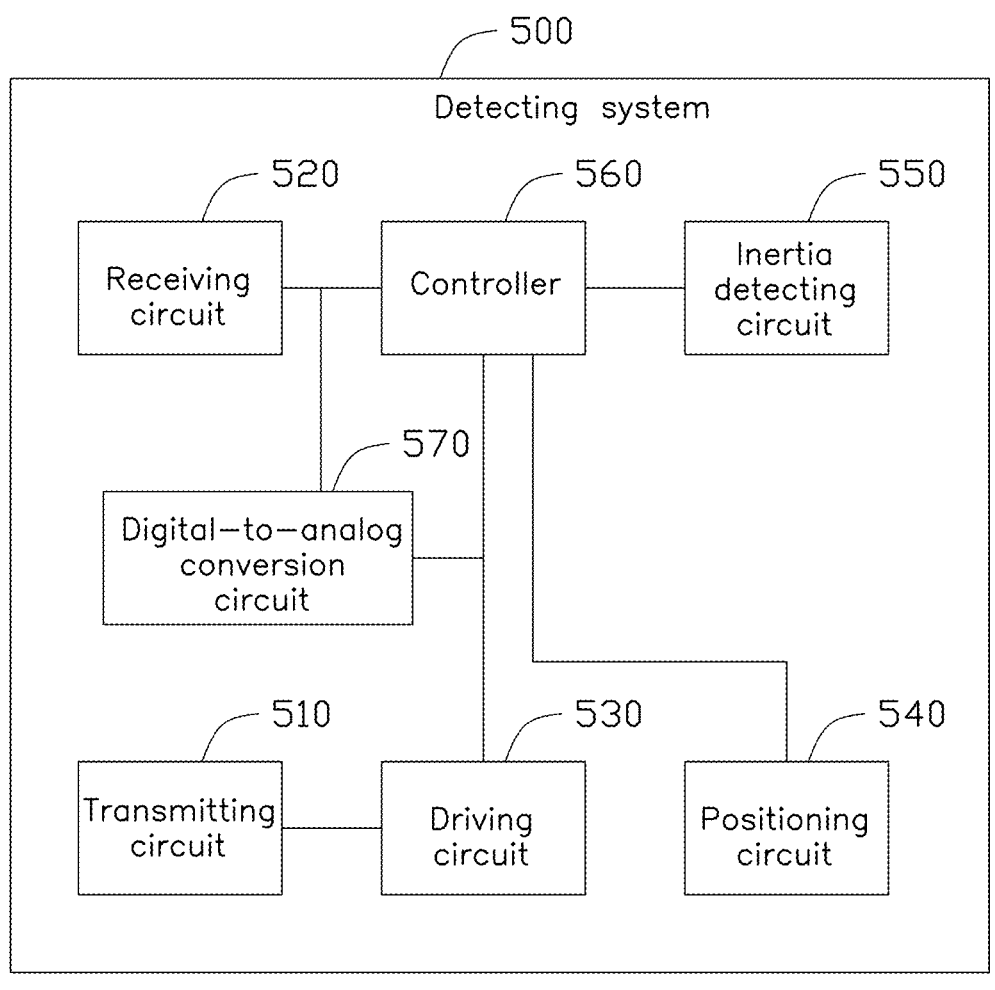
FIG. 6 is a schematic diagram of another embodiment of the present application of a detecting system.

In some embodiments, as shown in FIG. 6, the detecting system 500 further includes a digital-to-analog conversion circuit 570, which is connected to the receiving circuit 520, the driving circuit 530, and the controller 560. The controller 560 is also used to transmit control instructions to the receiving circuit 520 and the driving circuit 530 through the digital-to-analog conversion circuit 570.

In some embodiments, the transmitting circuit 510 is a laser transmitting circuit, and the receiving circuit 520 is a laser receiving circuit. Controlling the power consumption of the transmitting circuit 510 and the receiving circuit 520 includes: controlling a power, a frequency, and a number of transmissions per second of the laser transmitting circuit, and controlling a frequency and a number of receptions per second of the laser transmitting circuit.

In some embodiments, the transmitting circuit 510 is an ultrasonic transmitting circuit or an electromagnetic wave transmitting circuit, and the receiving circuit 520 is an ultrasonic receiving circuit or an electromagnetic wave receiving circuit. Controlling the power consumption of the transmitting circuit 510 and the receiving circuit 520 includes: controlling a power and a number of transmissions per second of the ultrasonic transmitting circuit or the electromagnetic wave transmitting circuit, and controlling a number of receptions per second of the ultrasonic receiving circuit or the electromagnetic wave receiving circuit.

An embodiment of the present application also provides a vehicle, comprising the detecting system in any of the above embodiments.

An embodiment of the present application further provides a computer storage medium, which stores a computer program. When the computer program is executed by a processor, the processor executes the above-mentioned control method for the detecting system.

In the above embodiments, all or part of the embodiments may be implemented by software, hardware, firmware or any combination thereof. When implemented by software, all or part of the embodiments may be implemented in the form of a computer program product. The computer program product includes one or more computer instructions. When the computer program instructions are loaded and executed on a computer, the process or function described in the embodiment of the present application is generated in whole or in part. The computer may be a general-purpose computer, a special-purpose computer, a computer network, or other programmable device. The computer instructions may be stored in a computer storage medium or transmitted via the computer storage medium. The computer instructions may be transmitted from one website, computer, server or data center to another website, computer, server or data center via wired (e.g., coaxial cable, optical fiber, digital subscriber line (DSL)) or wireless (e.g., infrared, wireless, microwave, etc.) means. The computer storage medium may be any available medium that can be accessed by a computer or a data storage device such as a server or data center that includes one or more available media. The available medium may be a magnetic medium (e.g., a floppy disk, a hard disk, a magnetic tape), an optical medium (e.g., a digital versatile disc (DVD)), or a semiconductor medium (e.g., a solid state disk (SSD)).

Those skilled in the art can understand that all or part of the processes in the above-mentioned embodiments can be implemented by instructing the relevant hardware through a computer program, and the program can be stored in a computer-readable storage medium. When the program is executed, it can include the processes of the embodiments of the above-mentioned methods. The aforementioned storage medium includes: ROM, RAM, magnetic disk or optical disk and other media that can store program codes. In the absence of conflict, the technical features in this embodiment and the implementation scheme can be combined arbitrarily.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A control method for detecting system, the detecting system is provided with a transmitting circuit, a receiving circuit, a driving circuit, a positioning circuit, and an inertia detecting circuit; the transmitting circuit and the receiving circuit configured to detect a distance to an object within a target range, the driving circuit configured to supply power to the transmitting circuit and the receiving circuit and control a power consumption of the transmitting circuit and the receiving circuit; the control method comprising:

(a) obtaining positioning information of a current cycle according to the positioning circuit, and obtaining acceleration information of the current cycle according to the inertia detecting circuit;

(b) obtaining a speed and an acceleration of the current cycle according to the positioning information, the acceleration information, and a preset correction algorithm;

(c) obtaining a predicted speed and a predicted acceleration of a next cycle according to the speed, the acceleration, and a preset prediction algorithm; and (d) in the next cycle, controlling the driving circuit according to the predicted speed and the predicted acceleration to control the power consumption of the transmitting circuit and the receiving circuit, and returning to step (a).

2. The control method of claim 1, wherein the predicted speed and the predicted acceleration are proportional to the power consumption.

3. The control method of claim 1, wherein the step (b) comprises:

obtaining an initial speed according to the positioning information;

calibrating the initial speed according to the acceleration information to obtain the speed; and performing algorithm simulation according to the acceleration information and historical accelerations to obtain the acceleration.

4. The control method of claim 1, wherein the step (c) comprises:

calculating a difference between the acceleration of the current cycle and an acceleration of a previous cycle;

obtaining the predicted acceleration of the next cycle according to the acceleration of the current cycle and the difference when the difference is greater than a preset difference is determined; and obtaining the predicted speed of the next cycle according to the predicted acceleration and the speed.

5. The control method of claim 1, wherein controlling the power consumption of the transmitting circuit and the receiving circuit comprises:

controlling a power of the transmitting circuit; and/or controlling a number of signal transmissions of the transmitting circuit and a number of signal receptions of the receiving circuit;

wherein the power, the number of signal transmissions, and the number of signal receptions are proportional to the predicted speed and the predicted acceleration.

6. A detecting system comprising a transmitting circuit, a receiving circuit, a driving circuit, a positioning circuit, an inertia detecting circuit, and a controller;

the transmitting circuit and the receiving circuit configured to detect a distance to an object within a target range, the driving circuit configured to supply power to the transmitting circuit and the receiving circuit and control a power consumption of the transmitting circuit and the receiving circuit, the controller connected to the receiving circuit, the driving circuit, the positioning circuit, and the inertia detection circuit;

the positioning circuit obtaining positioning information of a current cycle, the inertia detecting circuit obtaining acceleration information of the current cycle;

the controller configured to:

(a) obtain the positioning information of the current cycle from the positioning circuit, and obtain the acceleration information of the current cycle from the inertia detecting circuit;

(b) obtain a speed and an acceleration of the current cycle according to the positioning information, the acceleration information, and a preset correction algorithm;

(c) obtain a predicted speed and a predicted acceleration of a next cycle according to the speed, the acceleration, and a preset prediction algorithm; and (d) in the next cycle, control the driving circuit according to the predicted speed and the predicted acceleration to control the power consumption of the transmitting circuit and the receiving circuit, and returning to step (a).

7. The detecting system of claim 6, wherein the predicted speed and the predicted acceleration are proportional to the power consumption.

8. The detecting system of claim 6, wherein the step (b) comprises:

obtain an initial speed according to the positioning information;

calibrate the initial speed according to the acceleration information to obtain the speed; and perform algorithm simulation according to the acceleration information and historical accelerations to obtain the acceleration.

9. The detecting system of claim 6, wherein the step (c) comprises:

calculate a difference between the acceleration of the current cycle and an acceleration of a previous cycle;

obtain the predicted acceleration of the next cycle according to the acceleration of the current cycle and the difference when the difference is greater than a preset difference is determined; and obtain the predicted speed of the next cycle according to the predicted acceleration and the speed.

10. The detecting system of claim 6, wherein controlling the power consumption of the transmitting circuit and the receiving circuit comprises:

controlling a power of the transmitting circuit; and/or controlling a number of signal transmissions of the transmitting circuit and a number of signal receptions of the receiving circuit;

wherein the power, the number of signal transmissions, and the number of signal receptions are proportional to the predicted speed and the predicted acceleration.

11. The detecting system of claim 6, further comprising a digital-to-analog conversion circuit, wherein the digital-to-analog conversion circuit is connected to the receiving circuit, the driving circuit, and the controller; the controller is further configured to transmit control instructions to the receiving circuit and the driving circuit through the digital-to-analog conversion circuit.

12. The detecting system of claim 6, wherein the transmitting circuit is a laser transmitting circuit, the receiving circuit is a laser receiving circuit; wherein controlling the power consumption of the transmitting circuit and the receiving circuit comprises:

controlling a power, a frequency, and a number of transmissions per second of the laser transmitting circuit, and controlling a frequency and a number of receptions per second of the laser transmitting circuit.

13. The detecting system of claim 6, wherein the transmitting circuit is an ultrasonic transmitting circuit or an electromagnetic wave transmitting circuit, the receiving circuit is an ultrasonic receiving circuit or an electromagnetic wave receiving circuit; wherein controlling the power consumption of the transmitting circuit and the receiving circuit comprises:

controlling a power and a number of transmissions per second of the ultrasonic transmitting circuit or the electromagnetic wave transmitting circuit, and controlling a number of receptions per second of the ultrasonic receiving circuit or the electromagnetic wave receiving circuit.

14. A vehicle comprising:

a detecting system comprising a transmitting circuit, a receiving circuit, a driving circuit, a positioning circuit, an inertia detecting circuit, and a controller;

the transmitting circuit and the receiving circuit configured to detect a distance to an object within a target range, the driving circuit configured to supply power to the transmitting circuit and the receiving circuit and control a power consumption of the transmitting circuit and the receiving circuit, the controller connected to the receiving circuit, the driving circuit, the positioning circuit, and the inertia detection circuit;

the positioning circuit obtaining positioning information of a current cycle, the inertia detecting circuit obtaining acceleration information of the current cycle;

the controller configured to:

(a) obtain the positioning information of the current cycle from the positioning circuit, and obtain the acceleration information of the current cycle from the inertia detecting circuit;

(b) obtain a speed and an acceleration of the current cycle according to the positioning information, the acceleration information, and a preset correction algorithm;

(c) obtain a predicted speed and a predicted acceleration of a next cycle according to the speed, the acceleration, and a preset prediction algorithm; and (d) in the next cycle, control the driving circuit according to the predicted speed and the predicted acceleration to control the power consumption of the transmitting circuit and the receiving circuit, and returning to step (a).

15. The vehicle of claim 14, wherein the step (b) comprises:

obtain an initial speed according to the positioning information;

calibrate the initial speed according to the acceleration information to obtain the speed; and perform algorithm simulation according to the acceleration information and historical accelerations to obtain the acceleration.

16. The vehicle of claim 14, wherein the step (c) comprises:

calculate a difference between the acceleration of the current cycle and an acceleration of a previous cycle;

obtain the predicted acceleration of the next cycle according to the acceleration of the current cycle and the difference when the difference is greater than a preset difference is determined; and obtain the predicted speed of the next cycle according to the predicted acceleration and the speed.

17. The vehicle of claim 14, wherein the controlling the power consumption of the transmitting circuit and the receiving circuit comprises:

controlling a power of the transmitting circuit; and/or controlling a number of signal transmissions of the transmitting circuit and a number of signal receptions of the receiving circuit;

wherein the power, the number of signal transmissions, and the number of signal receptions are proportional to the predicted speed and the predicted acceleration, the predicted speed and the predicted acceleration are proportional to the power consumption.

18. The vehicle of claim 14, wherein the detecting system further comprises a digital-to-analog conversion circuit, the digital-to-analog conversion circuit is connected to the receiving circuit, the driving circuit, and the controller; the controller is further configured to transmit control instructions to the receiving circuit and the driving circuit through the digital-to-analog conversion circuit.

19. The vehicle of claim 14, wherein the transmitting circuit is a laser transmitting circuit, the receiving circuit is a laser receiving circuit; wherein controlling the power consumption of the transmitting circuit and the receiving circuit comprises:

controlling a power, a frequency, and a number of transmissions per second of the laser transmitting circuit, and controlling a frequency and a number of receptions per second of the laser transmitting circuit.

20. The vehicle of claim 14, wherein the transmitting circuit is an ultrasonic transmitting circuit or an electromagnetic wave transmitting circuit, the receiving circuit is an ultrasonic receiving circuit or an electromagnetic wave receiving circuit; wherein controlling the power consumption of the transmitting circuit and the receiving circuit comprises:

controlling a power and a number of transmissions per second of the ultrasonic transmitting circuit or the electromagnetic wave transmitting circuit, and controlling a number of receptions per second of the ultrasonic receiving circuit or the electromagnetic wave receiving circuit.

* * * * *